April 26, 1949.    C. A. McCUSKER    2,468,568
LAMINATED MIRROR
Filed Sept. 27, 1945
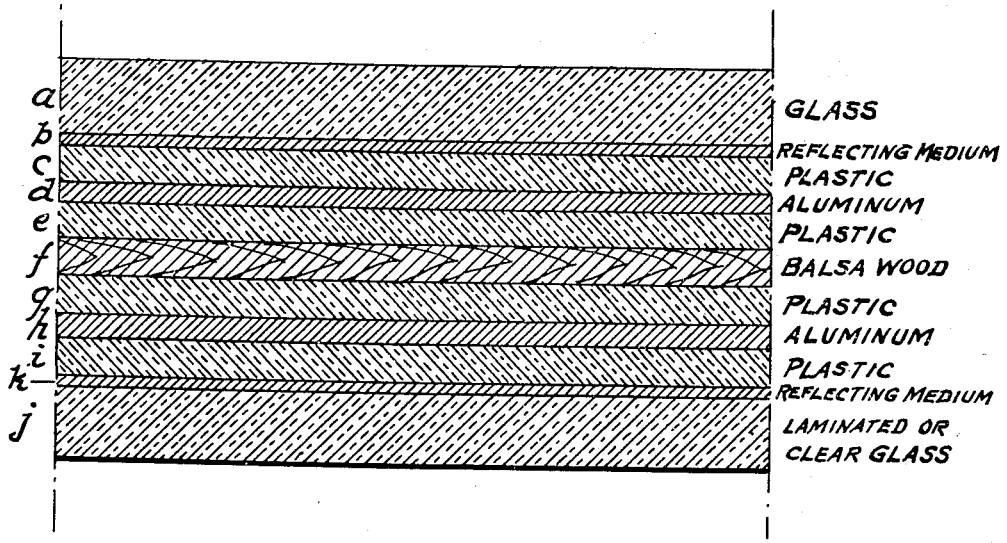
WITNESS:
INVENTOR.
Charles A. McCusker
BY
ATTORNEYS Patented Apr. 26, 1949

2,468,568

UNITED STATES PATENT OFFICE 2,468,568

LAMINATED MIRROR

Charles A. McCusker, Merion, Pa., assignor to Safetee Glass Company, Philadelphia, Pa., a corporation of Pennsylvania Application September 27, 1945, Serial No. 618,858

2 Claims. (Cl. 88—105)

The object of the invention is to provide a mirror having maximum strength and resistance to breakage. Other objects of the invention are to produce a double mirror having the above qualities but of a thickness not necessarily exceeding, and permissively less than, the thickness of a mirror of conventional construction; to maintain a secure bond between certain laminae of the mirror; and to effect facility and economy of manufacture.

The single figure of the drawing is a cross-sectional view of a double mirror constituting one preferred embodiment of the invention. This construction may be modified in greater or smaller degree, in order to form a single mirror, or a simplified double mirror, by the omission of certain elements as hereinafter described. The absolute thickness of all the elements is exaggerated; as well as is the relative thickness of certain of the laminae.

To the inner face of a glass plate $a$ is applied a coating $b$ of any material which is commonly employed in the art as a reflecting medium, which may have, but need not have, an opaque backing (not shown). To this reflecting medium $b$ is applied a layer of plastic material $c$. To the layer of plastic material $c$ is applied a thin metal sheet $d$, which is preferably of aluminum, but may be of stainless steel or other metal.

The construction, as above described, may constitute a complete mirror; but the strength of the mirror and resistance to breakage, or, if broken, resistance to shattering, is materially enhanced by applying to this simplified type of mirror the following additional layers. To the metal sheet $d$ is applied a layer of plastic material $e$. To this layer of plastic is applied a sheet of light weight wood $f$, preferably balsa wood. To this sheet of balsa wood is applied a layer of plastic $g$. To this layer of plastic is applied another thin metal sheet $h$. Preferably, also, I apply to the metal sheet $h$ a layer of plastic $i$ and a backing plate $j$ of glass, which may be either clear glass, or laminated glass simulating wood or marble.

The described construction forms a single mirror. To form a double mirror, it is necessary only to insert a reflecting medium $k$ between the elements $i$ and $j$. Less desirably, such a double mirror may be formed by applying the reflecting medium $k$ and the glass sheet $j$ to the structure comprising only the elements $a$, $b$, $c$, $d$ and $e$.

Another simplified type of mirror may be formed by omitting the elements $f$, $g$, $h$, $i$ and $k$ and applying the sheet of glass $j$ direct to the plastic layer $e$.

The layers of plastic material may have the qualities of poly-vinyl-butyral or methyl methacrylate.

The glass plates are thick relative to the layers of plastic. As an example, each glass plate may have a thickness of .075 inch and each plastic layer a thickness of .015 inch. The balsa wood sheet layer and the sheet or sheets of aluminum may have a thickness more or less approximating the thickness of a plastic layer. The thickness of the reflecting medium may be most negligible. The thickness of the preferred type of mirror, comprising all the elements shown on the drawing, need not exceed one fourth of an inch.

In order to bond the reflecting medium $b$ or $k$ to the glass plate $a$ or $j$, it is desirable to apply to the inner face of the glass a film of transparent material that will bind itself both to the glass and to the reflecting medium. This film may be formed by flowing or spraying over the glass sheet a liquid transparent plastic or gelatin. The film should be of nominal, or almost negligible thickness, preferably between .001 and .0001 inch, although a greater thickness, while not advantageous, is permissive. If the film is a plastic or gelatin film, the material should be one that is solid at ordinary temperature but which starts to liquefy at a higher temperature. It should be applied to the glass at a still higher temperature in order that it shall have the necessary fluidity when sprayed or flowed upon the glass plate. A practicable material is a resin of the same type or composition as that forming the laminae $c$, $e$, $g$ and $i$.

It is advantageous to first apply the binder film to the glass and to then apply the reflecting medium to the binder, preferably by pouring or spraying it upon the binder film before the latter has solidified.

Instead of flowing or spraying the bonding film upon the glass plate it may be applied to the glass plate in the form of a solid, very thin sheet of plastic, gelatin or other suitable bonding material.

Similar binding films may be also applied between the balsa wood layer and the adjacent plastic layers and between the aluminum layer and the adjacent plastic layers. These elements will, however, adhere together without interposing any special bond, although such application of the special bond may be desirable in exceptional cases.

The glass plates $a$ and $j$ may be of ordinary colorless glass, or either or both of them may be colored. As hereinbefore stated, the glass plate *j* may be of laminated glass treated to simulate wood or marble.

The described construction and method of manufacture, especially if the reflecting media are bonded to the glass plates as described, produce a mirror of maximum strength. It has also a certain limited elasticity that increases its resistance to breakage if subjected to rough handling.

What I claim and desire to protect by Letters Patent is:

1. A laminated mirror comprising at its front a conventional glass plate and a reflecting medium, and a backing therefor including a thin, hard metal sheet, a sheet of wood, layers of plastic material, one plastic layer interposed between the reflecting medium and the metal sheet, and another plastic layer interposed between the metal sheet and the wood sheet, the backing also including a rear glass plate and at least one layer of plastic material between the rear glass plate and the wooden sheet; the specified elements arranged as defined giving the mirror maximum strength and a limited elasticity increasing resistance to breakage.

2. A laminated mirror comprising at its front a conventional glass plate, a backing therefor including a central sheet of wood, a rear glass plate, thin, hard metal sheets, one between each glass plate and the wood sheet, and layers of plastic material, one interposed between each glass plate and the more nearly adjacent metal sheet and one interposed between each metal sheet and the wooden sheet, adjacent elements being bound together to form an integral structure, and a reflecting medium interposed between at least one of the glass plates and the more nearly adjacent layer of plastic material; said arrangement of the specified elements giving the mirror maximum strength and at the same time a limited elasticity increasing resistance to breakage.

CHARLES A. McCUSKER.

REFERENCES CITED

The following references are of record in the file of this patent:

UNITED STATES PATENTS

| Number | Name | Date |
|---|---|---|
| 290,744 | Conroy et al. | Dec. 25, 1883 |
| 858,079 | Komorous | June 25, 1907 |
| 1,285,901 | Bausch et al. | Nov. 26, 1918 |
| 1,653,040 | Drake | Dec. 20, 1927 |
| 1,875,554 | Bell | Sept. 6, 1932 |
| 1,885,232 | Colbert | Nov. 1, 1932 |
| 1,890,166 | Shatto et al. | Dec. 6, 1932 |
| 1,934,802 | Hitchcock | Nov. 14, 1933 |
| 1,953,796 | Crocker | Apr. 3, 1934 |
| 2,062,646 | Fox | Dec. 1, 1936 |
| 2,175,698 | Netz | Oct. 10, 1939 |
| 2,307,532 | Murphy | Jan. 5, 1943 |
| 2,352,923 | Turner | July 4, 1944 |